United States Patent
Logosz

(10) Patent No.: US 7,140,576 B2
(45) Date of Patent: Nov. 28, 2006

(54) INFLATABLE WING WITH MANIFOLD

(76) Inventor: Tony Logosz, 1413 A St., Hood River, OR (US) 97031

( * ) Notice: Subject to any disclaimer, the term of this patent is extended or adjusted under 35 U.S.C. 154(b) by 0 days.

(21) Appl. No.: 10/773,652

(22) Filed: Feb. 6, 2004

(65) Prior Publication Data
US 2004/0188567 A1 Sep. 30, 2004

Related U.S. Application Data

(60) Provisional application No. 60/445,471, filed on Feb. 7, 2003.

(51) Int. Cl.
*B64D 17/02* (2006.01)

(52) U.S. Cl. .................. 244/146; 244/153 R

(58) Field of Classification Search .......... 244/153 R, 244/154, 155 A, 123.11, 146
See application file for complete search history.

(56) References Cited

U.S. PATENT DOCUMENTS

| | | | | |
|---|---|---|---|---|
| 2,486,158 A | * | 10/1949 | Haas | 244/33 |
| 4,708,078 A | * | 11/1987 | Legaignoux et al. | 114/102.23 |
| 5,244,169 A | * | 9/1993 | Brown et al. | 244/146 |
| 5,816,537 A | * | 10/1998 | Pascoe et al. | 244/153 R |
| 6,708,927 B1 | * | 3/2004 | Chen | 244/143 |
| 2004/0245400 A1 | * | 12/2004 | Montague | 244/153 R |

OTHER PUBLICATIONS www.kiteboarding.be Newspage showing entries for Apr. 2003.
www.kiteboarding.be Detail for Naish Octopus dated Apr. 18, 2003.
www.donmontague.com/octopus Link referenced in Cite No. 102.

* cited by examiner

*Primary Examiner*—Timothy D. Collins

(57) ABSTRACT

An aerodynamic wing with a leading edge inflatable strut and at least one inflatable rib strut, wherein the struts are provided with a connection air pathway that allows the leading edge strut to act as a manifold for the inflation of the connected rib struts. Preferably, the connection air pathway is provided with a valve mechanism for selectively isolating the connected rib strut from the leading edge strut.

11 Claims, 3 Drawing Sheets

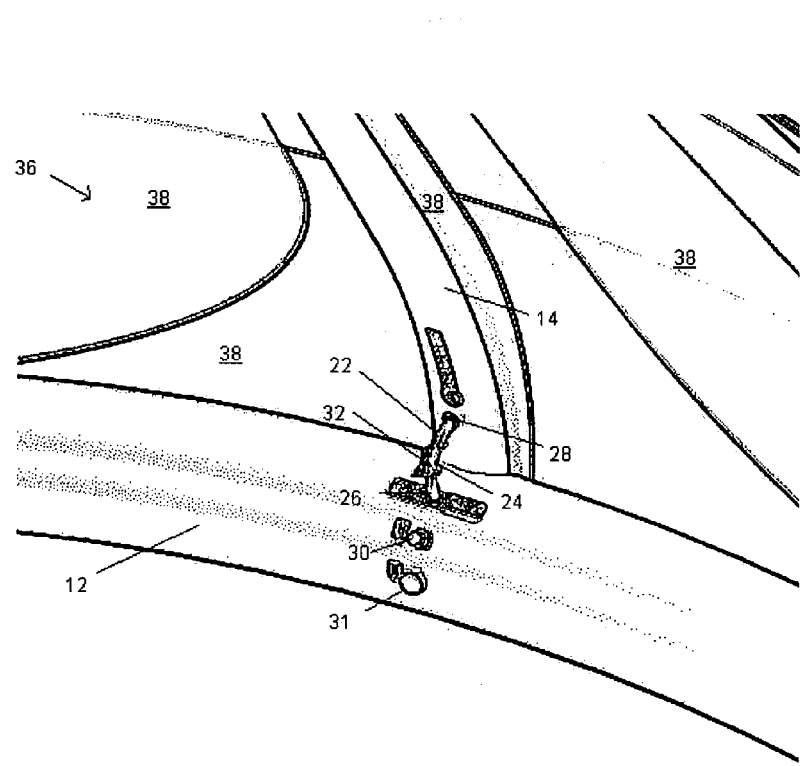
Fig. 2
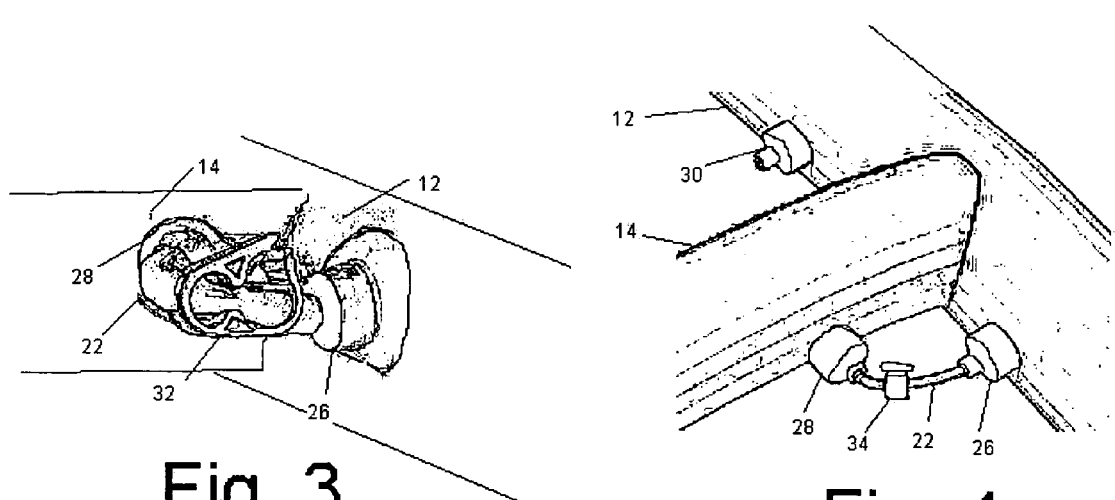
Fig. 3
Fig. 4

INFLATABLE WING WITH MANIFOLD

CROSS REFERENCE TO RELATED APPLICATIONS

This application claims priority of U.S. Provisional Patent Application Ser. No. 60/445,471, filed Feb. 7, 2003.

FIELD OF THE PRESENT INVENTION

The present invention relates generally to inflatable power or traction kites having a leading edge inflatable strut and one ore more inflatable rib struts that form the framework of wing of the kite. More particularly, the invention relates to a strut interconnection system that allows the simultaneous inflation of all the struts.

BACKGROUND OF THE INVENTION

Recently, considerable effort is being expended to develop wings capable of generating tractive force for the purposes of powering a user on a variety of vehicles that are tethered solely by flexible lines. Such wings can generally be considered kites. The development of kites capable of generating significant force has made possible numerous recreational pursuits. For example, kite surfing or kite boarding refers to a sport involving the use of a wind powered wing to pull the participant on a vehicle across a body of water. Similar sports involving the use of appropriately configured vehicles to traverse sand, earth, snow and ice are also being pursued. One having skill in the art will also recognize that wind powered wings can be used in any number of other applications, whether recreational or practical. With the development of these applications has come an increasing demand for kites having improved characteristics and ease of use.

One type of kite that has achieved popularity is a leading edge inflatable ("LEI") kite, typically comprising a semi-rigid framework of inflatable struts or spars that support a canopy to form the profile of the wing. This basic design is taught by U.S. Pat. No. 4,708,078 to Legaignoux, et al. The development of the LEI kite is generally credited with spurring the development of modern kite surfing due to its ability to be relaunched from the water's surface.

LEI kites by design allow the inflation and deflation of the struts. As discussed above, a primary benefit of the LEI design is the resulting buoyancy of the kite that facilitates relaunching the kite from the water. Further, the use of separately inflated struts offers an important safety characteristic. Since each strut is isolated from each other, the failure of one does not lead to loss of pressure in the others. Thus, if one rib strut were to puncture, the leading edge and the remaining struts would stay inflated. If the kite were in the water when the failure occurred, the inflated remaining struts would keep the kite afloat. If the kite were still flying when the failure occurred, the user likely would be able to continue flying the kite, return to shore and then land the kite. If the failure were to occur in the leading edge, it is unlikely that the kite could still be flown, but the remaining inflated rib struts would continue to provide buoyancy.

Inflation and deflation also contributes significantly to the convenience and practicality of the LEI kite design. A kite can be deflated for storage and transport, a virtual necessity given that typical sizes of recreational traction kite range from about 5 square meters to over 20 square meters.

Despite the benefits offered by the inflatable design, certain drawbacks have become apparent. Conventional LEI kites require that the leading edge and each rib strut be separately inflated and deflated. Accordingly, a user needs to separately operate a valve for each strut for either inflation or deflation. For inflation, the user needs to fit the pump nozzle into the valve, pump sufficient air into the strut, and remove the nozzle and close the valve without losing a significant amount of air pressure in the strut. This can be challenging if a check valve is not used, because it is easy to lose significant air pressure while removing the pump nozzle and closing the valve. Although the valve stem can be pinched to reduce air loss, this requires effort, especially under adverse conditions such as cold. Even if the valve is equipped with a check mechanism, such as a ball stopper, the operation often allows pressure loss anyway and the check mechanism can also hinder pinching the valve stem, adding to the chance of significant air pressure loss. For deflation, the user may only need to open each valve. However, if some type of check valve is employed, such as a ball stopper, the user must manipulate each valve to let the air out of the strut. Furthermore, many users opt to use their pump to speed the deflation of the struts as well. Naturally, this requires that the pump nozzle be fit into the valve for each strut to be deflated. Each of these valve operations must be multiplied by the number of separate struts in the kite. Smaller LEI kites often have three to five rib struts in addition to the leading edge. Larger kites often have seven or more rib struts. Although not an great burden, manipulating the valves and fitting the pump nozzle for each strut represents a significant portion of the overall time required to prepare the kite for use or to deflate the kite for transport and storage.

Using separate valves for each strut also has the potential to undermine the performance of the kite. Since the user must independently inflate and then remove the pump nozzle before closing the valve for each strut, there is a significant chance that the struts will not be inflated to the same pressure. As one having skill in the art will appreciate, this can cause the performance of the kite to suffer. For example, the rigidity of the kite depends in part upon the structure imparted by the strut framework. If there are significant differences in inflation pressure between the rib struts, the kite will not behave in a consistent manner and will have decreased stability.

Accordingly, it is an object of the present invention to provide a LEI kite design the offers increased convenience by reducing the time and effort required to inflate the kite.

It is also an object of the present invention to provide a LEI kite design that helps ensure maximum performance consistency.

It is another object of the present invention to provide a LEI kite design increases the stability of kite at relatively lower inflation pressures.

It is yet another object of the present invention to provide a LEI kite design that maintains the safety benefits of isolated air chambers.

SUMMARY OF THE INVENTION

The invention is an inflatable structure comprising a plurality of inflatable chambers and a flexible material secured to the chambers wherein a primary inflatable chamber communicates by way of air pathway connections to at least one secondary inflatable chamber. In one embodiment, the structure is configured as an aerodynamic wing capable of generating lifting force, such as a LEI kite. The air pathway connection may have a valve mechanism capable of restricting air flow from the secondary inflatable chamber to the primary inflatable chamber. Preferably, the valve mechanism can be selectively operated to air to flow from the secondary inflatable chamber to the primary inflatable chamber, and may be a clamp, a gate valve, globe valve, ball valve, butterfly valve and check valve, or the like. The air pathway connection may be configured as an external or internal system.

In another embodiment, the invention is an aerodynamic wing comprising an inflatable leading edge strut, at least one inflatable rib strut and an air pathway connection, wherein the air pathway connection allows air flow between the leading edge strut and a rib strut. The air pathway connection is a valve mechanism capable of selectively restricting air flow between the rib strut and the leading edge strut. Preferably, the valve mechanism comprises a clamp and the air pathway connection comprises a flexible tube.

The invention also comprises a method for preparing a leading edge inflatable kite for use including the steps of providing a kite having an inflatable leading edge strut, at least one inflatable rib strut and an air pathway connection that allow air to flow from the leading edge strut to the rib strut, supplying air to the leading edge strut, allowing air to travel from the leading edge into the rib strut, and operating a valve mechanism on the air pathway connection to restrict the flow of air from the rib strut to the leading edge strut. The method may also include deflating the kite by opening a valve in the leading edge and operating the valve mechanism on the air pathway connection to allow the flow of air from the rib strut to the leading edge strut.

BRIEF DESCRIPTION OF THE DRAWINGS

Further features and advantages will become apparent from the following and more particular description of the preferred embodiments of the invention, as illustrated in the accompanying drawings, and in which like referenced characters generally refer to the same parts or elements throughout the views, and in which:

FIG. 2 is partial perspective view of a rib strut and a leading edge strut air pathway connection according to the invention comprising a clamp;

FIG. 3 is a detail view of the clamp shown in FIG. 2 in its open configuration;

FIG. 4 is another partial perspective view of a rib strut and a leading edge strut connection according to the invention comprising a mechanical valve.

DETAILED DESCRIPTION OF THE INVENTION

Before describing the present invention in detail, it is to be understood that this invention is not limited to particularly exemplified materials, methods or structures as such may, of course, vary. Thus, although a number of materials and methods similar or equivalent to those described herein can be used in the practice of the present invention, the preferred materials and methods are described herein.

It is also to be understood that the terminology used herein is for the purpose of describing particular embodiments of the invention only and is not intended to be limiting.

Unless defined otherwise, all technical and scientific terms used herein have the same meaning as commonly understood by one having ordinary skill in the art to which the invention pertains.

Further, all publications, patents and patent applications cited herein, whether supra or infra, are hereby incorporated by reference in their entirety.

Finally, as used in this specification and the appended claims, the singular forms "a, "an" and "the" include plural referents unless the content clearly dictates otherwise.

The present invention is an aerodynamic wing having a lifting surface with a leading edge, a trailing edge, and a flexible canopy that substantially forms a lifting surface. With reference to presently preferred embodiments, canopy is used to describe the material that forms the majority of a wing used in a lifting application, such as a parachute, hang glider or kite. However, canopy, as used herein, also is meant to include the body of a sail, and the like. The wing further comprises more than one inflatable air chambers configured as a leading edge strut and one or more rib struts that form a framework for the wing. The leading edge strut and one or more of the rib struts are provided with a connection air pathway that allows the leading edge strut to act as a manifold for the inflation of the connected rib struts. Preferably, the connection air pathway is provided with a valve mechanism for selectively isolating the connected rib strut from the leading edge strut. The principles of this invention can be applied to any structure supported by a framework of a plurality of air chambers. For example, such structures may be aerodynamic wings formed by a flexible material, such as a sailboat sail, a windsurfing sail, a parachute, a paraglider, a hang glider, kites for powering boats or other vehicles and the like, but can also include any other applications that use independent inflatable members.

Figure 1:
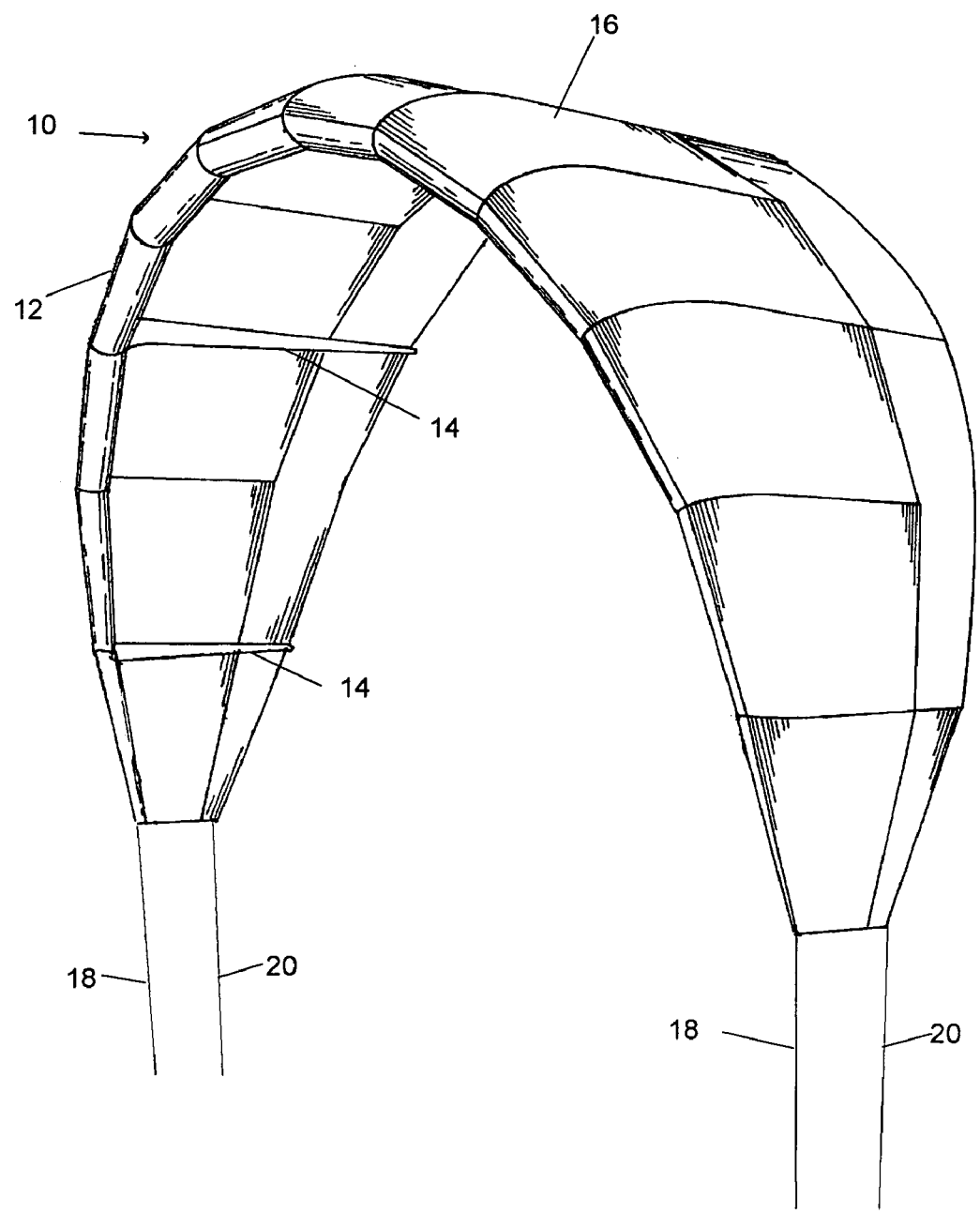
FIG. 1 is a perspective view of a LEI kite embodying features of the invention.

Turning to FIG. 1, an inflatable leading edge (LEI) kite 10 is shown that can be provided with the various advantages made possible by the present invention. As can be seen, kite 10 is generally in the shape of an arc and comprises an inflatable strut 12 that forms the leading edge of kite 10. A plurality of inflatable rib struts 14 are aligned transversely with leading edge strut 12. A canopy 16 is secured to the top of the framework created by struts 12 and 14. Control lines 18 and 20 are attached to the tips of kite 10. Kite 10 as shown comprises a conventional four line kite that utilizes front lines 18 to sheet kite 10 by changing the angle of attack and back lines 20 to transmit steering forces.

As shown in more detail in FIG. 2, inflatable rib struts 14 communicate with leading edge strut 12 by way of air pathway connection 22. In this embodiment, air pathway connection 22 comprises a flexible, deformable tube 24 that is fitted to inflation nipples 26 and 28 that provide access to the air chambers of leading edge strut 12 and rib strut 14, respectively. Leading edge strut 12 further comprises a pump nipple 30 that is configured to releasably connect with a conventional inflation/deflation pump nozzle (not shown). Pump nipple 30 preferably is a valve similar to those used with conventional LEI kites, so that it may be closed with a stopper after inflation. If desired, a check valve can be used, such a ball stopper. A second valve 31 may also be provided in leading edge strut 12 to speed deflation, which can be particularly desirable with larger kites. One having skill in the art will recognize that given the interconnection between leading edge strut 12 and rib struts 14 provided by air pathway connection 22, the pump nipple alternatively could be provided in one of the rib struts, if desired. Air pathway connection 22 preferably comprises a valve mechanism 32. In this embodiment, FIG. 2 shows that valve mechanism 32 is a clamp 34 that deforms tube 24 sufficiently to seal the tube and substantially prevent the passage of air between leading edge strut 12 and rib strut 14. FIG. 3 shows the same clamp 34 in an open configuration to allow the passage of air from leading edge strut 12 to rib strut 14. For the purposes of maximizing weight savings, clamp 34 is a currently preferred valve mechanism.

As known in the art, the canopy 36 of kite 10 typically comprises multiple panels 38, each of which has a specific shape. When the shaped panels are sewn together, the two-dimensional canopy material can take on a three-dimensional profile. Panel materials can be any suitable planar, flexible materials including cotton, paper, plastics, such as polyesters, Mylar, Teijin, Dacron, polyurethane, vinyl, and/or nylon, other fabrics, and the like. A presently preferred material is a rip stop high tenacity polyester fabric. Canopy 36 is secured to inflatable struts 12 and 14 to maintain that three-dimensional profile. In many embodiments, the struts in a LEI kite comprise a casing made of materials similar to canopy panel materials, but generally higher strength. The casing is responsible for imparting shape and strength to the strut, but is not necessarily sufficiently airtight. In such cases, a relatively airtight bladder (not shown) is used that upon inflation expands within the casing to support and define the structure. Suitable bladder materials include polyethylene, polyurethane, rubbers, latex, and the like. Alternatively, if the casing is sufficiently airtight, the use of a separate bladder can be avoided, providing weight savings and improving the durability of the inflatable structure. A currently preferred material for air pathway connection 22 is surgical tubing, but any flexible airtight material can be used as desired.

In an alternative embodiment, shown in FIG. 4, air pathway connection 22 has a valve mechanism 32 that comprises a mechanical shut off valve 34 such as a gate valve, ball valve, globe valve or butterfly valve. Further, a check valve may also be used, preferably allowing air to travel from the leading edge strut 12 to rib strut 14, but not to return. Also preferably, such a check valve should allow the user to selectively override this directional constraint to allow rib strut 14 to be deflated when desired. One having skill in the art will recognize that many types of valves are suitable.

As shown in FIGS. 2 through 4, currently preferred embodiments of the invention employ an external air pathway connection 22. This allows conventional LEI kite designs to be configured with the features of the invention as simply as possible and makes the system removable. Indeed, existing prior art kites can be retrofitted to embody the features of the invention by adding sufficient nipples 26 to the leading edge strut. The added nipples can then be connected to existing rib strut nipples 28 by a suitable air pathway connection 22. Alternatively, an air pathway connection 22 having multiple branches to correspond to the separate rib struts 14 can be connected to a single nipple on the leading edge strut. It may be preferable to provide a kit comprising the extra nipples 26, the air pathway connections 22, the valve mechanisms 32 and any supplies necessary to install them. The use of external air pathway connections 22 allow kites having the features of the invention to be repaired in a conventional manner should there be a puncture in the strut.

Figure 5:
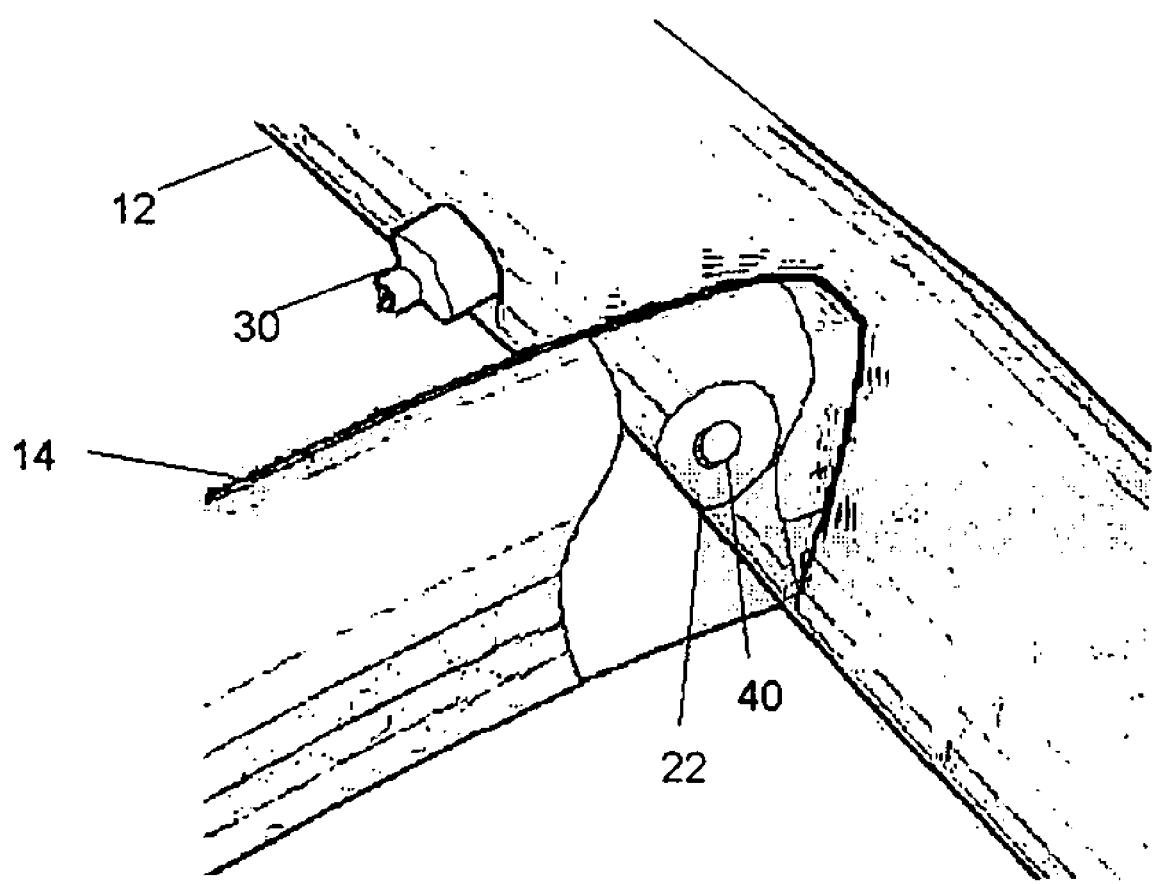
FIG. 5 is partial sectional schematic of a rib strut and a leading edge strut connection according to the invention with a portion of the rib strut cut away to show an internal valve.

In another embodiment of the invention, air pathway connection 22 is configured to be internalized within the strut framework as shown in FIG. 5. Specifically, the end of rib strut 14 that abuts a portion of leading edge strut 12 forms an interface and air pathway connection 22 is provided at that interface. FIG. 5 shows a portion of rib strut 14 removed so that air pathway connection 22 can be seen at the interface where rib strut 14 abuts and is connected to leading edge strut 12. Air pathway connection 22 may further comprise a valve 40 of any suitable type to selectively restrict air flow from rib strut 14 to leading edge 12 so that a puncture in any one of the struts will not affect the others. Valve 40 should be operable when the kite is in both its inflated and deflated condition. As one having skill in the art will recognize, the use of a one way check valve may be preferable. Also preferably, such a check valve should selectively allow the return of air from rib strut 14 to leading edge strut 12 when the kite is deflated. Alternatively, with the use of more durable bladder materials or in embodiments that do not require a bladder, the risk of puncture may be substantially lowered. Thus, if the chance of puncture is sufficiently low, it may be desirable to omit the valve mechanism entirely. As can be appreciated, the use of an internal air pathway connection minimizes obstructions on the surface of the kite, generally improving its aerodynamic qualities while also minimizing the chance of snagging the kite on obstructions.

In use, the system of the invention allows the user to quickly and efficiently prepare the kite for use. Specifically, a conventional pump is connected to pump nipple 30 to provide air to leading edge strut 12. Valve mechanisms 32 are placed in a configuration that allows air to travel through leading edge strut nipple 26, air connection pathway 22 and rib strut nipple 28. Thus, air may be introduced into leading edge strut 12 and rib struts 14 simultaneously. Once a desired air pressure has been reached within rib struts 14, valve mechanisms 32 can be operated, such as by closing clamps 34, to prevent air from traveling between rib struts 14 and leading edge strut 12. As will be appreciated, air pressure is now substantially equalized in each rib strut 14 and the leading edge strut 12. If desired, the user may further adjust the pressure within leading edge strut 12 by either adding or releasing an amount of air from pump nipple 30. After use, the kite may be deflated for storage by simply opening valve mechanisms 32 and pump nipple 34. A secondary deflation valve may also be provided in leading edge strut 12 if desired.

As one of skill in the art will recognize, other conventional control line systems are applicable to these types of kites. For example, an inflatable kite having features of the invention can be controlled by two lines with the addition of a bridle. Other kite line control systems can be used as well.

Described herein is a preferred embodiment, however, one skilled in the art will understand that there are equivalent alternative embodiments.

What is claimed is:

1. An aerodynamic wing comprising an inflatable leading edge strut, at least one inflatable rib strut, an air pathway connection and a valve mechanism, wherein the air pathway connection allows air flow between the leading edge strut and a rib strut and wherein the valve mechanism has a first configuration that permits air flow from the leading edge strut to a rib strut and a second configuration that prevents air flow from the rib strut to the leading edge strut, such that the second configuration prevents air flow from the rib strut to the leading edge strut when pressure in the rib strut is greater than pressure in the leading edge strut.

2. The aerodynamic wing of claim 1, wherein the valve mechanism comprises a clamp and the air pathway connection comprises a flexible tube.

3. The aerodynamic wing of claim 1, wherein the second configuration of the valve mechanism prevents air from traveling from the leading edge strut to the rib strut when the rib strut loses air pressure.

4. The aerodynamic wing of claim 1, wherein the valve mechanism comprises a mechanical shut off valve.

5. The aerodynamic wing of claim 1, wherein the valve mechanism comprises a one way check valve.

6. The aerodynamic wing of claim 1, wherein the air pathway connection is external.

7. The aerodynamic wing of claim 1, wherein the air pathway connection is internal.

8. The aerodynamic wing of claim 5, wherein the air pathway connection is internal.

9. A method for using an aerodynamic wing comprising the steps of:
   a) providing an aerodynamic wing comprising an inflatable leading edge strut, at least one inflatable rib strut, an air pathway connection and a valve mechanism, wherein the air pathway connection allows air flow between the leading edge strut and a rib strut and wherein the valve mechanism has a first configuration that permits air flow from the leading edge strut to a rib strut and a second configuration that prevents air flow from the rib strut to the leading edge strut;
   b) supplying air to the leading edge strut so that air travels from the leading edge into the rib strut; and
   c) restricting air flow between the rib strut to the leading edge strut when pressure in the rib strut is greater than pressure in the leading edge strut.

10. The method of claim 9, wherein the valve mechanism comprises a mechanical shut off valve and further comprising the step of manually operating the shut off valve after supplying air to the leading edge strut, wherein manually operating the shut off valve prevents air from traveling from the rib strut to the leading edge strut.

11. The method of claim 9, wherein the valve mechanism comprises a one way check valve which restricts air flow between the rib strut to the leading edge strut when pressure in the rib strut is greater than pressure in the leading edge strut.

* * * * *